United States Patent [19]

Ogawa et al.

[11] Patent Number: 5,251,853
[45] Date of Patent: Oct. 12, 1993

[54] CANOPY FOR PARAGLIDER AND/OR PARACHUTE

[75] Inventors: Takahisa Ogawa, Saitama; Hideyuki Mori, Shiga; Yasuhiro Matsuda, Osaka, all of Japan

[73] Assignees: Falhawk Co., Ltd., Tokyo; Ashimori Industry Co., Ltd., Osaka, both of Japan

[21] Appl. No.: 753,550

[22] Filed: Sep. 3, 1991

[30] Foreign Application Priority Data

Sep. 7, 1990 [JP] Japan .................. 2-94675[U]

[51] Int. Cl.⁵ .............................................. B64D 17/02
[52] U.S. Cl. ........................................ 244/145; 244/900
[58] Field of Search ................... 244/16, 24, 25, 142, 244/145, 146, 900

[56] References Cited

U.S. PATENT DOCUMENTS

| | | | |
|---|---|---|---|
| 3,222,016 | 12/1965 | Boone . | |
| 3,428,277 | 2/1969 | Everett, Jr. . | |
| 3,749,337 | 7/1973 | Jalbert | 244/145 |
| 3,822,844 | 7/1974 | Sutton | 244/145 |
| 4,175,722 | 11/1979 | Higgins | 244/145 |
| 4,771,970 | 9/1988 | Sutton | 244/145 |
| 4,860,970 | 8/1989 | Roselli | 244/16 |

FOREIGN PATENT DOCUMENTS

| | | | |
|---|---|---|---|
| 163966 | 12/1985 | European Pat. Off. | ............ 255/145 |
| 3707463 | 10/1987 | Fed. Rep. of Germany . | |
| 276988 | 11/1928 | United Kingdom . | |

*Primary Examiner*—Michael S. Huppert
*Assistant Examiner*—VirnaLissi Ansley
*Attorney, Agent, or Firm*—Sughrue, Mion, Zinn, Macpeak & Seas

[57] ABSTRACT

A canopy for a paraglider or a parachute. The canopy including upper and lower sides and a plurality of ribs extending between the sides and made of a mesh cloth. The upper and lower sides and the ribs define a plurality of cells which are arranged adjacent one another. Each of the cells has an opening at a front end thereof for introducing air into the canopy. The mesh cloth of the ribs includes large and small apertures disposed therein. According to one embodiment, either the large or the small apertures are arranged in matrix-like groups which are separated from one another by the other of the large and small apertures. According to another embodiment, the large and small apertures are disposed in groups which are arranged parallel to one another in the vertical direction.

24 Claims, 2 Drawing Sheets

CANOPY FOR PARAGLIDER AND/OR PARACHUTE

BACKGROUND OF THE INVENTION

1. Field of the Invention

The present invention relates to a canopy for a paraglider and a parachute, and, more particularly, to an arrangement of partition walls in the canopy.

2. Background

Recently, it has become popular to glide in the air using a paraglider and to skydive using a parachute having a construction similar to that of the paraglider.

FIG. 3 illustrates such a paraglider. The paraglider comprises a canopy 10, suspension cords 11 and a harness 12. The canopy 10 includes an upper side and a lower side to form an inflatable body 13. The body 13 is divided into a plurality of small chambers 15, referred to as reams or cells, by partition walls 14 which extend between the upper and lower sides of the canopy 10 at predetermined intervals along a span of the canopy. As can be seen in FIG. 4, the partition walls 14 have a wing-like shape and extend from a leading edge of the canopy 10 to a trailing edge thereof. The partition walls are commonly referred to as ribs.

A plurality of air intakes 16 through which the air is introduced to inflate the canopy 10 are disposed at the leading edges of the respective cells 15. The canopy 10 inflated by the introduced air is maintained in a proper wing-like shape by virtue of the pressure of the introduced air and the wing-like shape of the partition walls 14. According to this arrangement, since an aerodynamic lift acts on the inflated canopy 10, a flyer can glide in the air using the paraglider. As can be understood, the partition walls 14 are important in maintaining the canopy 10 in the proper wing-like shape.

Next, a conventional partition wall 14 will be described with reference to FIG. 4. An air impermeable material is used for the partition walls 14 as well as for the inflatable body 13. The materials consist of, for example, a cloth made by impregnating with synthetic resins a woven fabric made of synthetic fibers such as polyester fibers and polyamide fibers, or a cloth made by laminating a synthetic resin film onto at least one surface of the woven fabric. The cloth is required to be light weight yet strong. Generally, a cloth having 45–50 g/m² in metsuke-weight (weight per unit area), and 40–50 Kgf/5cm in fracture strength is used. Each of the partition walls 14 made of such material is provided with three or four circular air passage holes 17 along its length so that mutually adjacent cells 15 communicate with each other through these holes 17. For the purpose of reinforcing the partition wall 14, woven belts 18 are sewn to the partition wall 14 between the holes 17 along the height of the partition wall 14. A lower end of each belt 18 serves as a securing portion 19 for the suspension line 11. Due to the provision of the air passage holes 17 in the partition walls 14, if any of air intake 16 is still closed during the inflation, the air introduced through the other opened air intakes inflates all of the cells 15 through the air passage holes 17, thereby uniformly inflating and maintaining the entire canopy 10 in the wing-like shape.

However, when the paraglider takes off, tension is applied on the partition walls 14, especially, in the direction of the height thereof due to the internal pressure of the introduced air within the canopy 10 acting thereon, and the weight of the flyer transmitted thereto through the suspension lines 11 and the securing portions 19. Therefore, since each of the partition walls 14 is formed with the air passage holes 17, the tension causes stress concentration near the air passage holes 17 to deform the partition walls 14. As a result, it is difficult to maintain the partition walls 14 in a proper wing-like shape, and sufficient aerodynamic lift cannot be obtained. Thus, the conventional partition wall arrangement has a problem in that rapid lift cannot be performed.

On the other hand, for the purpose of securing sufficient strength in the partition wall 14, the formation of each of the air passage holes 17 in each partition wall 14 is restricted such that the area of the air passage holes 11 is not greater than 20% of the area of the partition wall 14. Accordingly, particularly when the wind is weak, another problem arises in that much more time is required to inflate the entire canopy 10 by introducing air through the air passage holes 17. Further, when turning the paraglider while gliding in the air, a control line 20, which is coupled to the trailing edge of the canopy 10, is pulled downwardly so as to slightly fold the canopy downwardly like a flap of an airplane. Therefore, if the air communication through the air passage holes 17 is insufficient, a substantial amount of time is required to return the partially folded shape of the canopy to the original wing-like shape after completing the turn. As a result, it is impossible to control the paraglider promptly and the paraglider may experience a stall.

SUMMARY OF THE INVENTION

Accordingly, it is an object of the present invention to provide a canopy for a paraglider, which produces high flying performance.

In order to attain the above-noted and other objects, the present invention provides a canopy adapted for use with a paraglider and/or parachute, which comprises an inflatable body defining a first chamber therein, and a plurality of partition walls for dividing the first chamber into small second chambers, the plurality of partition walls being disposed within the inflatable body at predetermined intervals along a span of the inflatable body, and each of the partition walls being wing-shaped and made of a mesh cloth formed by weaving or knitting synthetic fibers.

The mesh cloth may include high-density aperture portions in a form of cross stripes, and/or otherwise, may include high-density aperture portions in a form of vertical stripes.

The present invention further provides a paraglider comprising a canopy made of sheet material, which includes an upper side, a lower side, a plurality of ribs extending from one of the sides to the other side and made of mesh material, a plurality of cells respectively defined by the upper and lower sides and the ribs, and air intakes opened into the cells at the front ends thereof; and means for suspending a flyer from the canopy, coupled to at least some of the ribs.

DETAILED DESCRIPTION OF THE PREFERRED EMBODIMENTS

Preferred embodiments of the present invention will now be described with reference to the drawings attached hereto.

Figure 3:
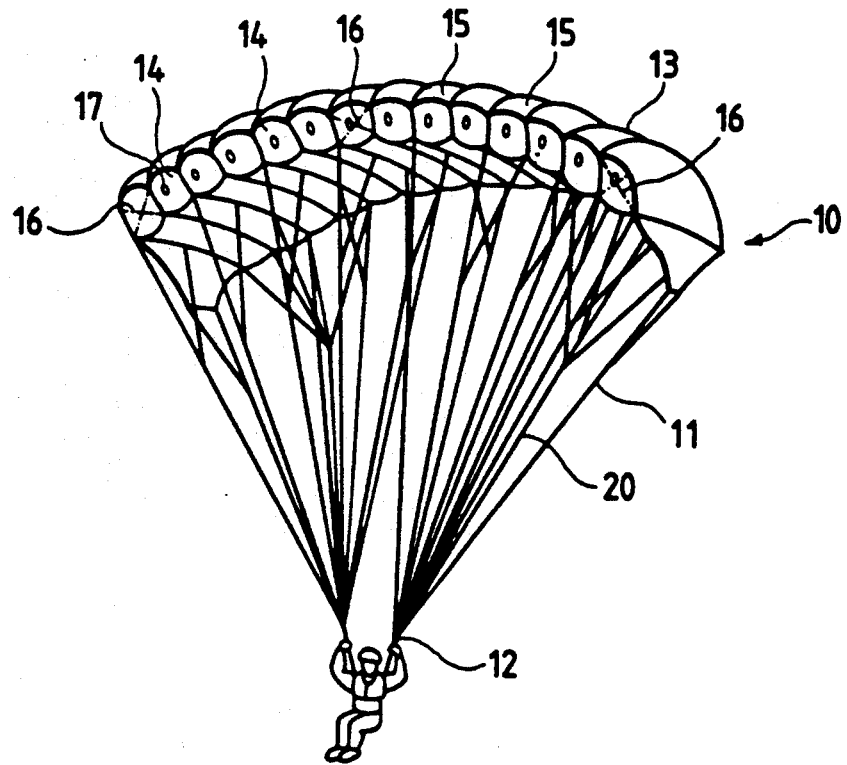
FIG. 3 is a perspective view showing a typical paraglider.

The general construction of the paraglider of the present invention is the same as that of the paraglider shown in FIG. 3. Accordingly, only the partition wall arrangement, which is the major part of the present invention, will be described in detail below.

Figure 1:
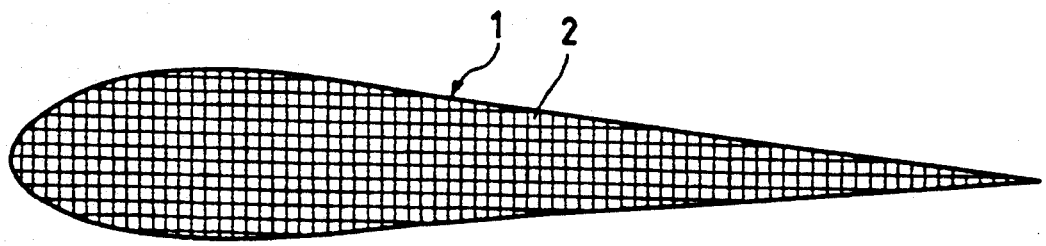
FIG. 1 is a side view showing a partition wall for a canopy of a paraglider according to an embodiment of the present invention.

Referring to FIG. 1, a partition wall 1 is made by weaving or knitting synthetic fibers into a mesh cloth which is formed with a large number of apertures 2. Examples of the material used for the mesh cloth include synthetic fibers such as polyester fibers, polyamide fibers and poly (vinyl alcohol) fibers, and high-strength low-elongation fibers such as aromatic polamide fibers, aromatic polyester fibers and superhigh-strength polyethylene fibers. However, it is preferable to use polyester fibers having high weather resistance.

As to the fabric construction for the mesh cloth, the plain weave, the mock leno weave, the gauze weave, the tri-axial weave, the warp knit, the weft knit, the warp and weft inlay stitch, and the multi-axial warp knit are all suitable. Further, it is preferable that the warp and the weft be subjected to stitching along a 45° direction relative thereto so as to prevent elongation thereof. Furthermore, the mesh cloth thus constructed is preferably impregnated with polyurethane resins or polyester resins for the purpose of preventing the slippage of the warp and the weft. Due to the impregnation, the partition wall 1 is enhanced in rigidity, so that it is easier to sew the partition wall 1 onto the body 13.

Concerning the amount of area of the apertures 2 relative to the partition wall 1 as a whole, it is preferable that the area of the apertures be no less than 50% of the area of the partition wall. Further, it is preferable that the strength of the mesh cloth be no less than the fracture strength of 30 Kg/5cm in directions of both the warp and the weft.

Figure 2A:
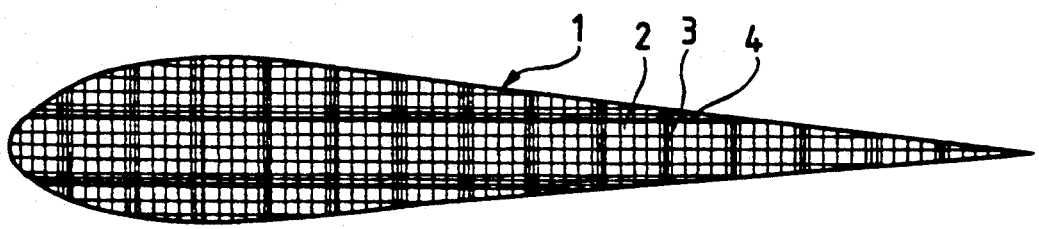
FIGS. 2a and 2b are side view showing other partition walls for a canopy of a paraglider according to other embodiments of the present invention.
Figure 2B:
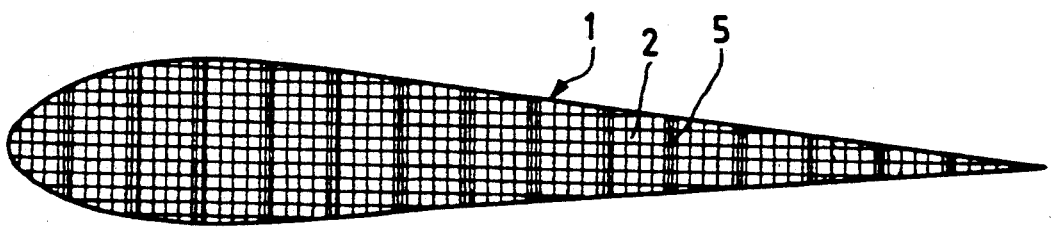

The apertures 2 are formed uniformly in the entire body of the partition wall 1, as shown in FIG. 1. However, the present invention should not be restricted thereto or thereby. For example, as shown in FIG. 2A, high-density aperture portions 3 and 4 (i.e., portions where the apertures are relatively small resulting in a high density area of the mesh cloth) may be formed in the mesh partition wall 1 in the form of horizontal and vertical cross stripes. Specifically, the partition wall may include apertures of varying sizes. In FIG. 2A, large apertures are arranged in a plurality of matrix-like groups separated from one another by a plurality of small apertures. Similarly, as shown in FIG. 2B, high-density aperture portions 5 may be formed in the mesh partition wall 1 in the form of vertical stripes. Specifically, large and small apertures are arranged in respective groups disposed parallel to one another in, for example, the vertical direction. In these embodiments, in which the high-density aperture portions are provided, the high-density aperture portions serve as reinforcement for the partition wall 1, so that reinforcing belts 18 sewn into conventional partition walls can be dispensed with. As a result, the weight of the paraglider can be reduced. Also, sewing the partition wall to the inflatable body 13 is easier.

Conventional methods can be used for sewing the partition wall 1 to the inflatable body 13. For example, an edge of the partition wall 14 may be lapped and the lapped edge sewn to the inflatable body with a reinforcing member similar to the reinforcing belt 18.

Next, a preferable mesh cloth for the partition wall 1 according to the present invention, will be described. For the mesh cloth, polyester fiber threads each having 70 denier/24 filaments are used for the warp and the weft. One warp group, consisting of three of the threads, and one weft group, consisting of three of the threads, are woven by the mock leno weave into a cloth at densities of 19 groups/inch with respect to warp and weft directions. The cloth is impregnated with aqueous dispersion liquid of polyurethane resins, and, thereafter, dried to obtain the mesh cloth to be used for the partition wall 1.

The mesh cloth thus obtained had 43 g/m$^2$ in the metsuke-weight. The fracture strength thereof with respect to the warp and weft directions were measured according to JIS L 1096, and they were 49.0–50.0 Kgf/5cm. Accordingly, the mesh cloth bore comparison with the conventional cloth.

The apertures 2 defined by the warp and the weft were uniformly formed in the entire body of the cloth. A ratio of the apertures relative to the entire cloth is expressed by the following formula:

{(warp group pitch − warp group width) ×
(weft group pitch − weft group width)/
(warp group pitch × weft group pitch)} × 100

Numerical values were measured by using a magnifying glass and the ratio was calculated as follows:

{1.34 mm−0.24 mm)×(1.34 mm−0.24 mm) /(1.34
mm×1.34 mm)}×100

Accordingly, the ratio of the apertures relative to the entire cloth was 67%.

As is apparent from the above-noted data, the mesh cloth for the partition wall according to the present invention possesses the following features: light-weight (43 g/m$^2$), uniformity of the apertures in the entire body of the cloth, and a high aperture ratio of 67% as compared with the conventional cloth.

According to the present invention, a canopy adapted for use with a paraglider and/or parachute, comprises an inflatable body defining a first chamber therein, and a plurality of partition walls for dividing the first chamber into small second chambers, the plurality of partition walls being disposed within the inflatable body at predetermined intervals along a width of the body, and each of said partition walls having a wing-shape and being made of a mesh cloth formed by weaving synthetic fibers.

Since the partition walls of the mesh cloth can disperse the tension applied thereto uniformly, the partition walls are prevented from experiencing deformation caused by the stress concentration, so that the partition walls can be surely maintained in a proper wing-shape. Accordingly, sufficient aerodynamic lift is obtained when the canopy is inflated, so that the paraglider can rapidly rise. Further, since the cells communicate with each other through the entire body of the partition walls, the introduced air can rapidly inflate the canopy even if the amount of wind is low. Similarly, after turning the paraglider while gliding in the air, the folded canopy can be easily, responsively returned to the original proper wing form since the communication of the introduced air is significantly enhanced by the mesh partition walls. Accordingly, the flying performance and safety of the paraglider having the partition wall arrangement of the present invention can be significantly improved, in comparison with the conventional paragliders.

Figure 4:
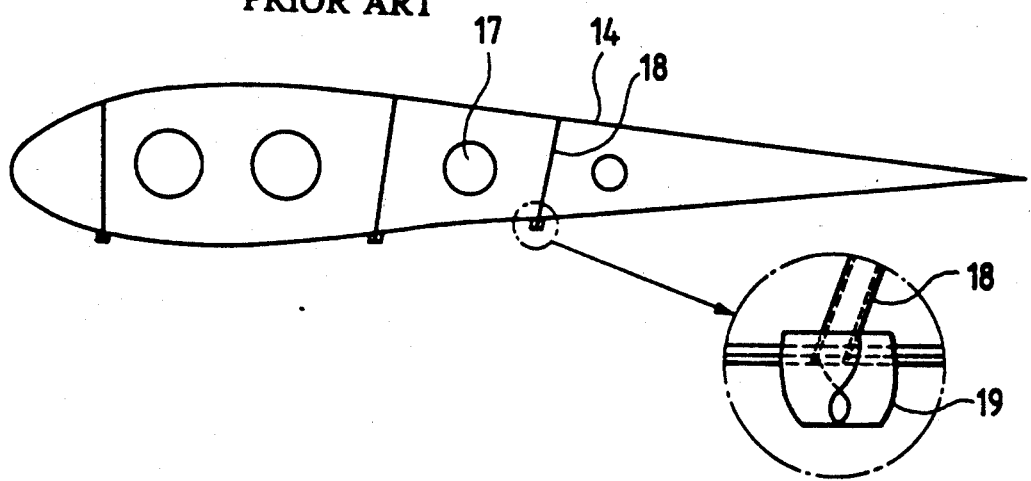
FIG. 4 shows a partition wall used in a conventional paraglider.

Further, in a case where the high-density aperture portions are provided in the mesh partition wall, it is not necessary to sew the reinforcing belts, as shown in FIG. 4, to the partition wall so as to reinforce the partition wall in the height direction thereof, so that the paraglider as a whole is lightweight.

Furthermore, the present invention is applicable to the parachute used for the skydiving, and the same effects and advantages are expected.

What is claimed is:

1. A canopy adapted for use with a paraglider and/or parachute, said canopy comprising:
   an inflatable body defining a first chamber therein; and
   a plurality of partition walls for dividing the first chamber into small second chambers, said plurality of partition walls being disposed within said inflatable body at predetermined intervals along a width thereof, each of said partition walls being in the form of a wing-shape and made of a screen mesh made by weaving or knitting synthetic fibers and having apertures provided therein so that adjacent second chambers communicate with each other wherein a ratio of the area of openings in said screen mesh of each of said partition walls to the total area of each of said partition walls is no less than 50%.

2. The canopy according to claim 1, wherein said screen mesh is impregnated with polyurethane resins or polyester resins.

3. The canopy according to claim 2, wherein the ratio is approximately 67%.

4. The canopy according to claim 1, wherein said screen mesh includes apertures disposed therein having various sizes.

5. The canopy according to claim 4, wherein said screen mesh includes large and small apertures disposed in groups which are arrange parallel to one another.

6. The canopy according to claim 5, wherein said groups or large and small apertures are arranged parallel to one another in a vertical direction.

7. The canopy according to claim 2, wherein said mesh cloth includes apertures disposed therein having various sizes.

8. The canopy according to claim 7, wherein said screen mesh includes large and small apertures disposed in groups which are arrange parallel to one another.

9. The canopy according to claim 8, wherein said groups of large and small apertures are arranged parallel to one another in a vertical direction.

10. The canopy according to claim 1, wherein the ratio is approximately 67%.

11. A canopy adapted for use with a paraglider and/or parachute, said canopy comprising:
    an inflatable body defining a first chamber therein; and
    a plurality of partition walls for dividing the first chamber into small second chambers, said plurality of partition walls being disposed within said inflatable body at predetermined intervals along a width thereof, each of said partition walls being in the form of a wing-shape and made of a mesh cloth made by weaving or knitting synthetic fibers wherein said mesh cloth includes large and small apertures disposed therein, one of said large and small apertures, wherein a ratio of the area of openings in said mesh cloth of each of said partition walls to the total area of each of said partition walls is no less than 50% being arranged in matrix-like groups separated from one another by the other of said large and small apertures.

12. The canopy of claim 11, wherein said mesh cloth is impregnated with polyurethane resins or polyester resins.

13. A paraglider, comprising:
    a canopy made of sheet material and including upper and lower sides, and a plurality of ribs extending between said sides made of a mesh cloth, said upper and lower sides and said ribs defining a plurality of cells arranged adjacent one another, each of said cells having an opening at a front end thereof for introducing air therein; and
    means for suspending a flyer from said canopy, coupled to at least some of said ribs wherein said mesh cloth includes apertures disposed therein having various sizes, wherein said mesh cloth includes large and small apertures disposed therein, one of said large and small apertures being arranged in matrix-like groups separated from one another by the other of said large and small apertures, wherein a ratio of the area of openings in said mesh cloth of each of said partition walls to the total area of said partition walls is no less than 50%.

14. The paraglider according to claim 13, wherein said mesh cloth is impregnated with polyurethane resins or polyester resins.

15. A paraglider, comprising:
    a canopy made of sheet material and including upper and lower sides, and a plurality of ribs extending between said sides made of a screen mesh having apertures provided therein, said upper and lower sides and said ribs defining a plurality of cells arranged adjacent on another, each of said cells having an opening at a front end thereof for introducing air therein, adjacent cells communicating with each other through said apertures, wherein a ratio of the area of openings in said screen mesh of each of said partition walls to the total area of each of said partition walls is no less than 50%; and
    means for suspending a flyer from said canopy, coupled to at least some of said ribs.

16. The paraglider according to claim 15, wherein said screen mesh is impregnated with polyurethane resins or polyester resins.

17. The paraglider according to claim 16, wherein said screen mesh includes apertures disposed therein having various sizes.

18. The paraglider according to claim 17, wherein said screen includes large and small apertures disposed in groups which are arranged parallel to one another.

19. The paraglider according to claim 18, wherein said groups of large and small apertures are arranged parallel to one another in a vertical direction.

20. The paraglider according to claim 16, wherein the ratio is approximately 67%.

21. The paraglider according to claim 15, wherein said mesh cloth includes apertures disposed therein having various sizes.

22. The paraglider according to claim 21, wherein said screen mesh includes large and small apertures disposed in groups which are arranged parallel to one another.

23. The paraglider according to claim 22, wherein said groups of large and small apertures are arranged parallel to one another in a vertical direction.

24. The paraglider according to claim 15, wherein the ratio is approximately 67%.

* * * * *